United States Patent [19]

Reinecke

[11] 4,260,199
[45] Apr. 7, 1981

[54] ANTI-SKID AND ANTI-SPIN BRAKING SYSTEM

[75] Inventor: Erich Reinecke, Burgdorf, Fed. Rep. of Germany

[73] Assignee: Wabco Fahrzeugbremsen G.m.b.H., Hanover, Fed. Rep. of Germany

[21] Appl. No.: 25,624

[22] Filed: Mar. 30, 1979

[30] Foreign Application Priority Data

Apr. 28, 1978 [DE] Fed. Rep. of Germany ....... 2828813

[51] Int. Cl.$^3$ ............................................. B60T 8/08
[52] U.S. Cl. ...................................... 303/96; 303/97; 303/105
[58] Field of Search ................ 303/96, 109, 115, 119, 303/97, 101, 105, 106, 111, 113; 188/181 C, 182; 180/197, 271; 361/238

[56] References Cited

U.S. PATENT DOCUMENTS

| 2,914,359 | 11/1959 | Yarber | 303/106 X |
| 3,576,351 | 4/1971 | Collins | 303/97 X |
| 3,779,331 | 12/1973 | Burckhardt et al. | 188/181 C X |
| 3,936,096 | 2/1976 | Cumming | 303/113 X |
| 4,156,547 | 5/1979 | Marsh | 303/96 |

Primary Examiner—J. D. Miller
Assistant Examiner—Reinhard J. Eisenzopf
Attorney, Agent, or Firm—G. J. Falce; R. W. McIntire, Jr.

[57] ABSTRACT

A wheel spin control circuit which utilizes conventional anti-skid control apparatus for automotive-type vehicles including an operator's brake valve, brake cylinders, wheel speed sensors, wheel behavior evaluation circuitry and modulator valves to apply braking pressure to a sensed spinning wheel. A solenoid-operated control valve in parallel with the brake valve between the system air reservoir and modulator valves is actuated via a pushbutton switch whenever the operator senses a spinning wheel during acceleration to connect reservoir air to the modulator valves. The modulator valve of the slipping wheel is actuated by control signals emitted by the wheel behavior evaluation circuit to admit the reservoir air to pass to the brake cylinder of the spinning wheel to effect braking thereof. The pressure supply may be continuous or pulsed with or without a pressure-holding cycle.

3 Claims, 1 Drawing Figure

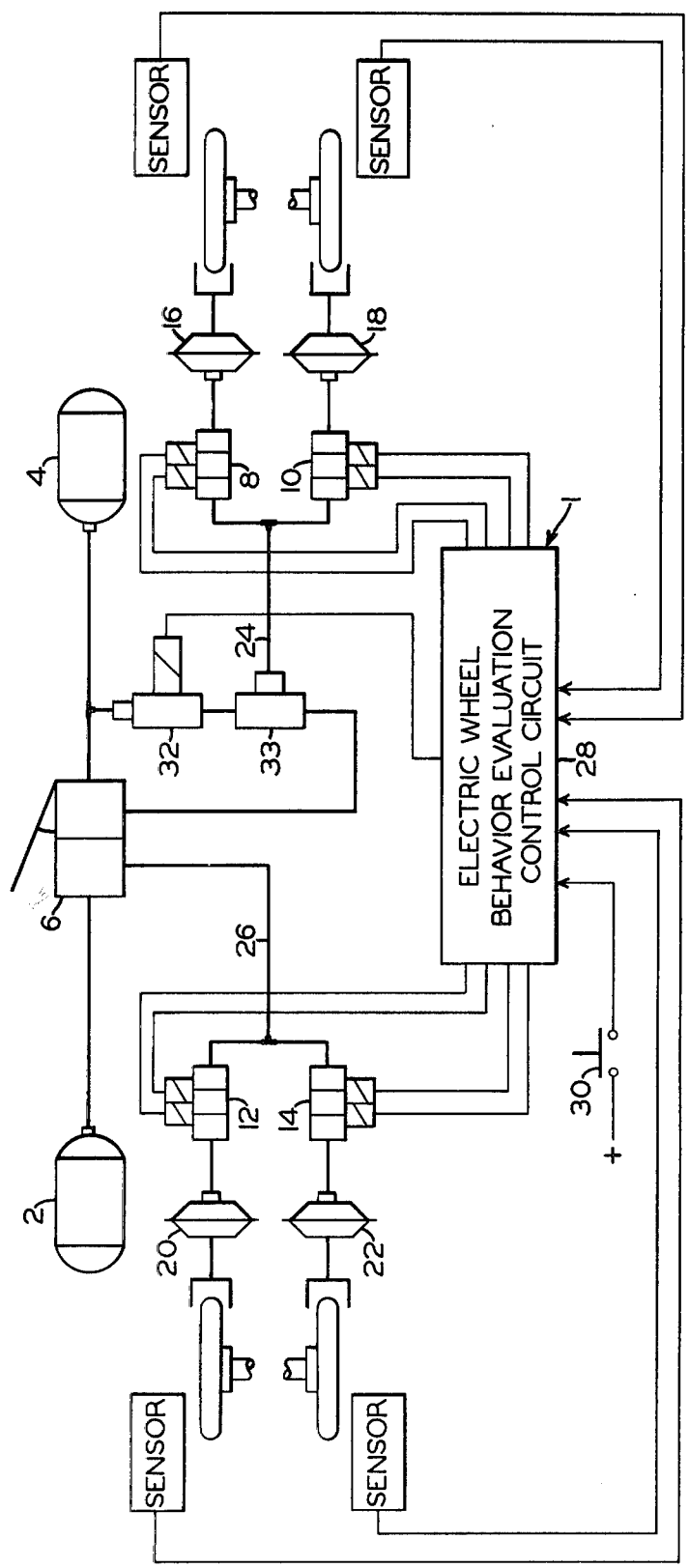

ANTI-SKID AND ANTI-SPIN BRAKING SYSTEM

BACKGROUND OF THE INVENTION

The present invention is concerned with a brake control arrangement for automotive-type vehicles that operate to prevent the spinning of one or more of the vehicle's drive wheels during acceleration and is particularly adapted to automotive-type vehicles having an anti-skid brake control system, with which the spin control system of the present invention is incorporated.

Spinning of the vehicle drive wheel(s) refers to the condition during acceleration when the wheel rotation exceeds a velocity corresponding to the linear velocity of the vehicle. Such spinning is often encountered when attempting to start on grades during conditions of low coefficients of friction.

There are presently known anti-slip type differential drives for automotive vehicles, but these drives are intended primarily for off-road operation, and are not generally acceptable for use on roadways.

SUMMARY OF THE INVENTION

The object of the present invention is to provide an economical yet reliable anti-spin control system that is employed in connection with existing wheel anti-skid control apparatus.

A further object of the invention is to provide an anti-spin control system in which a spinning drive wheel is detected by velocity comparison with a nondriven wheel and brake pressure is applied to the driven wheel when the velocity difference therebetween exceeds a predetermined value.

Still another object of the invention is to provide wheel spin control that is effective only during vehicle start-up.

The invention consists of providing a fluid pressure reservoir for each of two individual brake circuits controlled by the conventional operator's brake valve device. The circuit associated with the driven wheel brake circuits is arranged with a solenoid-operated control valve between the one reservoir and the driven wheel brake cylinders in parallel with the brake valve. A control switch in the operator's cab is actuated when wheel slip control is desired. This energizes the solenoid control valve to supply brake pressure directly from the reservoir to whichever wheel is detected by the electronic wheel skid/slip evaluation circuit as spinning relative to a nondriven wheel. Accordingly, the spinning wheel is braked to adapt its velocity to the linear velocity of the vehicle.

Modulator valves in each wheel brake cylinder supply line are controlled by circuitry in the wheel skid/spin evaluation circuit so as to deliver the brake pressure continuously, or alternatively to deliver the brake pressure in pulses and subsequently hold the brake pressure constant at a predetermined value.

BRIEF DESCRIPTION OF THE DRAWING

Other objects and advantages will appear in the following description when taken in conjunction with the accompanying single FIGURE drawing, which shows diagrammatically a braking control system for pressurizing the driven and nondriven wheel brake cylinders via individual braking circuits and for incorporating a bypass control of the driven wheels for preventing wheel spin during acceleration.

DESCRIPTION AND OPERATION

In accordance with a preferred embodiment of the present invention, there is provided for an automotive-type vehicle such as a truck, for example, a two-circuit brake control system having an electronic wheel-skid/spin evaluation circuit 1, a pair of fluid pressure reservoirs 2–4, an operator's brake valve device 6, and four solenoid-operated modulator valves 8–10–12–14, each associated with a respective wheel of a four-wheeled vehicle having brake cylinders 16–18–20–22 for the wheels. One output of brake valve device 6 is connected to the rear or driven wheel brake cylinders 16–18 via supply line 24, while the other output of brake cylinder device 6 is connected to the front or nondriven wheel brake cylinders 20–22 via supply line 26.

Incorporated with conventional anti-skid control circuitry in evaluation circuit 1 is electrical wheel spin control circuitry 28, which detects predetermined differences in rotational velocity between the driven and nondriven wheels, as monitored by wheel sensors associated with each wheel, and generates control signals for pressurizing the brake cylinder of a spinning driven wheel. A pushbutton-actuating switch 30 may be located in the vehicle cab for operation by the operator when wheel spin control is desired. When switch 30 is closed, circuitry 28 of evaluation circuit 1 is effective to energize the one solenoid of the driven wheel modulator valves 8–10. In the energized condition of this solenoid, these modulator valves interrupt delivery of fluid pressure from supply line 24 to brake cylinders 16 and 18. Concurrently, a solenoid-operated bypass valve 32 between reservoir 4 and supply line 24 is energized by the evaluation circuit to supply reservoir pressure to modulator valves 8 and 10 via a double check valve 33. Circuitry 28 of evaluation circuit 1 monitors the sensed wheel velocities and compares the velocity of each driven wheel with that of a nondriven wheel. When a slipping one of the driven wheels exceeds the velocity of a nondriven wheel with which it is compared, by a predetermined amount, circuit 28 de-energizes the one solenoid of modulator valve 8 or 10 associated with the spinning wheel to admit fluid pressure in supply line 24 to the spinning wheel brake cylinder. With the brakes becoming applied, the spinning wheel is gradually brought into correspondence with the nondriven wheels to obtain optimum wheel/road adhesion and directional stability. In the case of both of the driven wheels spinning in excess of the predetermined velocity difference, the one solenoid of both modulator valves 8 and 10 will be de-energized to admit braking pressure to both spinning wheel brake cylinders. When the effect of braking action on the spinning wheel(s) is sufficient to terminate spinning, circuitry 28 of evaluation circuit 1 again energizes the one solenoid of the appropriate modulator valve to terminate further supply of braking pressure and concurrently energizes a second solenoid of the modulator valve 8 and/or 10 to dump the braking pressure and accordingly terminate braking action on the wheel.

In the event a wheel spin recurs, such spinning will again be detected by circuit 28 and provide such control signals as to de-energize both solenoids of the spinning wheel modulator to restore braking pressure to the spinning wheel brake cylinder. Thus, the braking action on a spinning wheel, in accordance with the foregoing, is cyclic and continues until the wheel no longer exhibits a spin tendency.

Alternatively, circuitry 28 of evaluation control circuit 1 may be arranged to control the supply of brake pressure to a spinning wheel brake cylinder either continuously or in pulses until the nondriven wheel speed exceeds a predetermined velocity. At this point, control signals from circuit 28 are such as to hold the effective brake pressure constant by energizing the one solenoid and de-energizing the second solenoid of the spinning wheel modulator valve to close both the supply and exhaust ports. Whenever the wheel velocity difference falls below the predetermined threshold, the pressure in the braked wheel brake cylinder is exhausted and the control cycle is repeated.

Circuit 28 is further arranged to detect a predetermined speed of the vheicle in order to disable operation thereof insofar as providing the above-discussed functions are concerned. In terminating operation of the wheel spin control circuit 28 at a predetermined favorable speed during start-up, the brakes are prevented from overheating.

As a variation of the system arrangement shown in the drawing, actuating switch 30 may be eliminated and solenoid valve 32 energized by control circuit 28 any time the control circuit senses a predetermined wheel velocity difference between the driven and nondriven wheels during periods of brake release. In the event a brake application is in effect or wheel-skid control is in effect, a disabling circuit of evaluation control circuit 1 prevents operation of the wheel-spin control circuit 28 thereof.

A still further variation is that of employing the operator's brake valve device 6 to provide braking pressure to a driven wheel or wheels which spin during acceleration. In this case, solenoid valve 32 may be eliminated and the supply of brake pressure applied via the brake valve and whichever modulator valve has been actuated by the anti-spin brake control circuit 28. Such an arrangement, however, requires that modulator valves 12 and 14 of the nondriven wheels be operated to interrupt the supply of brake pressure to these wheels prior to operating brake valve device 6. This can be accomplished by arranging control circuit 28 to energize the solenoids of modulator valves 12 and 14 concurrent with such operation of modulator valves 8 and 10 when actuating switch 30 is closed.

By incorporating the anti-spin control circuitry 28 with conventional anti-skid control circuitry of evaluation circuit 1, which is well known, it is possible to make use of many already existing electrical components, thereby enhancing the economic considerations of the present invention.

Having now described the invention what I claim as new and desire to secure by Letters Patent, is:

1. A wheel anti-skid, anti-spin brake control system for a wheeled vehicle having driving and non-driving wheels comprising:
   (a) a brake cylinder device for each said wheel of said vehicle;
   (b) a source of fluid pressure;
   (c) operator-controlled brake valve means for connecting fluid pressure from said source to said brake cylinders of said driving wheels via a first pipe and to said brake cylinders of said non-driving wheels via a second pipe during a braking mode of vehicle operation;
   (d) sensor means for providing wheel speed signals in accordance with the rotational velocity of at least one of said driving wheels and at least one of said non-driving wheels;
   (e) wheel evaluation control means subject to said wheel speed signals for detecting a skid condition of a respective one of said wheels during said braking mode of vehicle operation, and for detecting a spin condition of a respective one of said driving wheels during a start-up mode of vehicle operation;
   (f) modulator valve means controlled by said wheel evaluation control means for controlling the fluid pressure connected from said source to said brake cylinders via said operator-controlled brake valve means during said braking mode of vehicle operation;
   (g) bypass valve means between said source of fluid pressure and said modulator valve means associated with said driving wheel brake cylinders for connecting fluid pressure thereto from said source during said start-up mode of vehicle operation;
   (h) said modulator valve means of said driving wheel brake cylinders being further controlled by said wheel evaluation control means during said start-up mode of vehicle operation to establish fluid pressure communication between said bypass valve means and said brake cylinder device of a spinning one of said driving wheels to effect the braking thereof; and
   (i) check valve means between said bypass valve means and said operator-controlled brake valve means, said check valve means being operatively responsive to the pressure supplied to said modulator valve means via said bypass valve means exceeding the pressure supplied via said operator's control valve device to prevent the back-flow of fluid pressure therepast during said start-up mode of vehicle operation.

2. A wheel anti-skid, anti-spin brake control system, as recited in claim 1, further characterized in that said check valve means is a double check valve device.

3. A wheel anti-skid, anti-spin brake control system, as recited in claim 1, further comprising:
   (a) said bypass valve means being a solenoid-operated valve device energized to an open position to establish said connection of fluid pressure from said source to said modulator valve means; and
   (b) selectively operable switch means for conditioning said wheel evaluation control circuit to energize said bypass valve means and to concurrently monitor said wheel speed signals to detect said spinning one of said driving wheels during said start-up mode of vehicle operation and accordingly operate said modulator valve means associated with said spinning one of said drive wheels to establish said connection of fluid pressure thereto from said source.

* * * * *